(12) United States Patent
Kunigita et al.

(10) Patent No.: US 11,094,107 B2
(45) Date of Patent: Aug. 17, 2021

(54) INFORMATION PROCESSING DEVICE AND IMAGE GENERATION METHOD

(71) Applicant: SONY INTERACTIVE ENTERTAINMENT INC., Tokyo (JP)

(72) Inventors: Hisayuki Kunigita, Kanagawa (JP); Masakazu Hayashi, Tokyo (JP); Kotaro Tajima, Kanagawa (JP); Robert Christopher Starkey, St. Albans (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/613,222

(22) PCT Filed: Jun. 8, 2017

(86) PCT No.: PCT/JP2017/021329
§ 371 (c)(1),
(2) Date: Nov. 13, 2019

(87) PCT Pub. No.: WO2018/225218
PCT Pub. Date: Dec. 13, 2018

(65) Prior Publication Data
US 2020/0175748 A1 Jun. 4, 2020

(51) Int. Cl.
*G06T 15/20* (2011.01)
*G06F 3/01* (2006.01)
(52) U.S. Cl.
CPC ............ *G06T 15/20* (2013.01); *G06F 3/012* (2013.01)
(58) Field of Classification Search
CPC ................................ G06T 15/20; G06F 3/012

USPC ......................................................... 345/424
See application file for complete search history.

(56) References Cited

U.S. PATENT DOCUMENTS

| 6,057,856 A | 5/2000 | Miyashita et al. |
| 10,713,670 B1* | 7/2020 | Moon ................ G06Q 30/0201 |
| 2014/0176416 A1* | 6/2014 | Horowitz ........... H04N 5/23219 345/156 |

(Continued)

FOREIGN PATENT DOCUMENTS

| JP | 2002-117415 A | 4/2002 |
| JP | 2005-174021 A | 6/2005 |
| JP | 2016-35742 A | 3/2016 |

OTHER PUBLICATIONS

International Preliminary Report on Patentability dated Dec. 19, 2019, from International Application No. PCT/JP2017/021329, 11 sheets.

(Continued)

*Primary Examiner* — Thomas J Lett
(74) *Attorney, Agent, or Firm* — Katten Muchin Rosenman LLP

(57) ABSTRACT

A behavior history data acquisition unit 304 acquires behavior history data on a plurality of users wearing head mounted displays on heads thereof and experiencing a same three-dimensional content space. A line-of-sight direction acquisition unit 312 acquires line-of-sight directions of the plurality of users in the three-dimensional content space, from the behavior history data on the plurality of users. A screen generation unit 316 generates, on a basis of the acquired line-of-sight directions of the plurality of users, an image concerning line of sights of the plurality of users in a three-dimensional virtual space.

7 Claims, 10 Drawing Sheets

(56) References Cited

U.S. PATENT DOCUMENTS

2014/0176744 A1* 6/2014 Horowitz ........... H04N 5/23219
                                              348/211.99
2014/0177906 A1* 6/2014 Horowitz ........... G06K 9/00335
                                              382/103
2018/0116578 A1* 5/2018 Tzvieli ................... A61B 5/318

OTHER PUBLICATIONS

International Search Report and Written Opinion dated Aug. 1, 2017, from International Application No. PCT/JP2017/021329, 6 sheets.

* cited by examiner

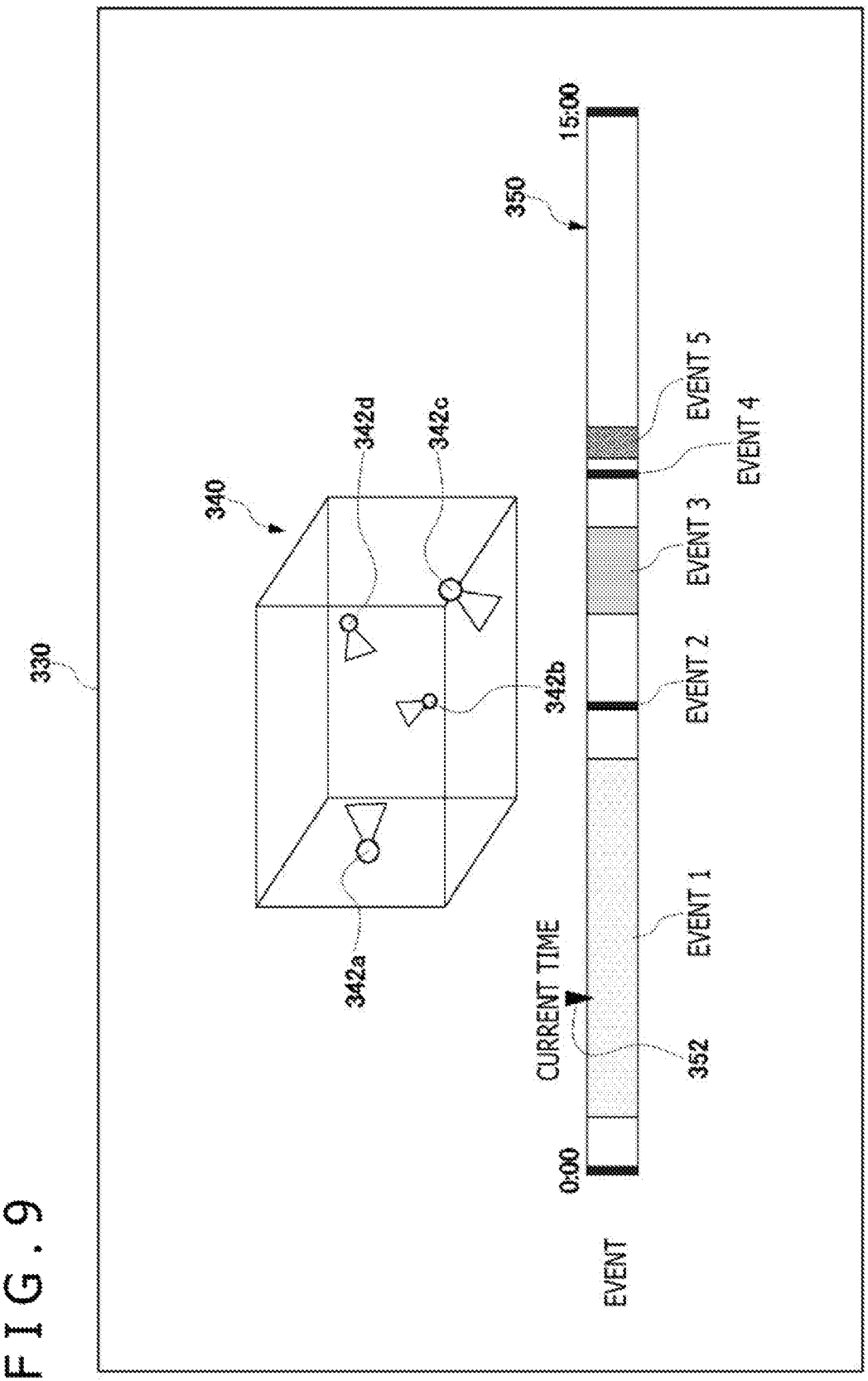

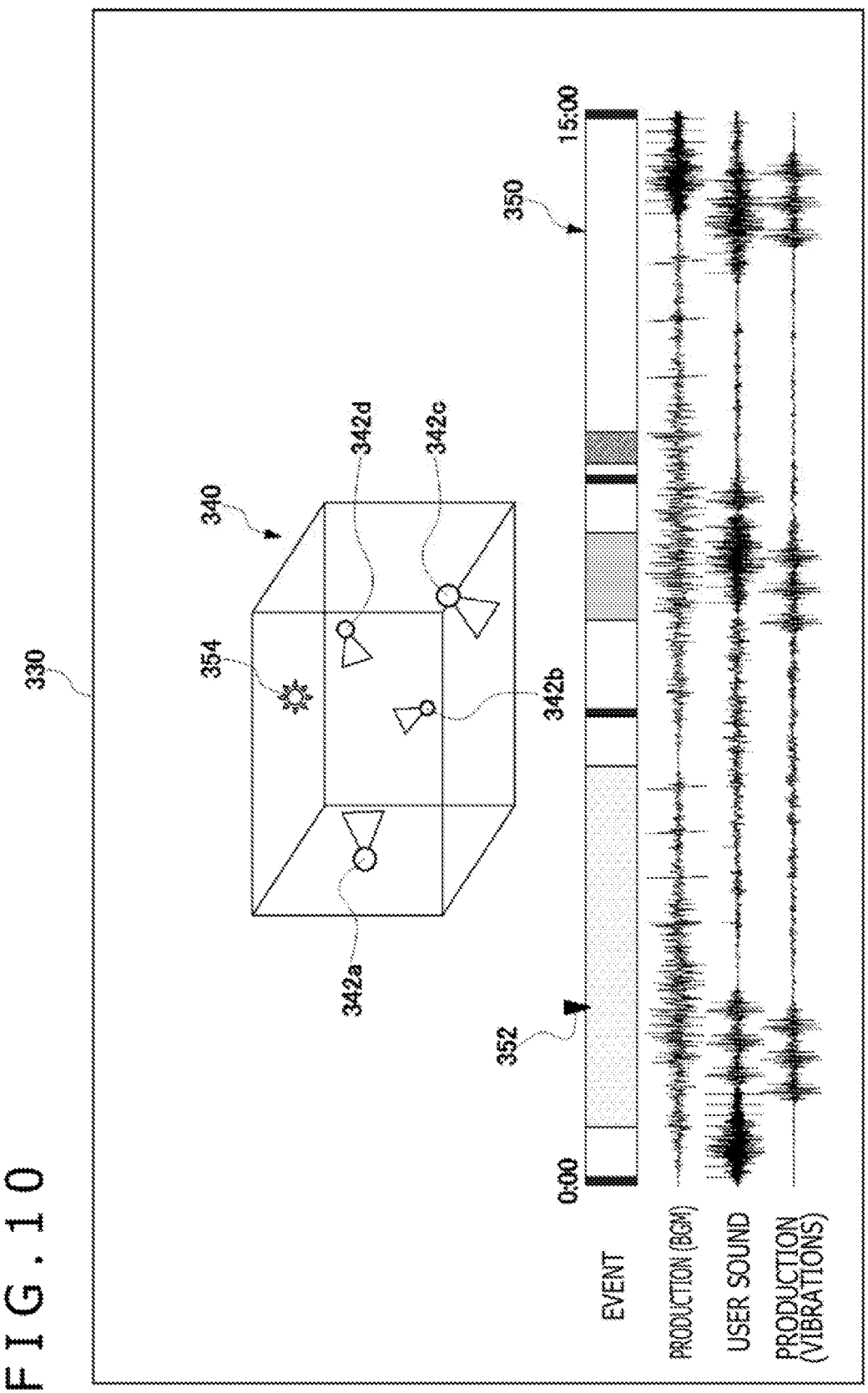

INFORMATION PROCESSING DEVICE AND IMAGE GENERATION METHOD

TECHNICAL FIELD

The present invention relates to a technique of processing behavior history data on a user wearing a head mounted display.

BACKGROUND ART

PTL 1 discloses a system in which a three-dimensional virtual reality space is shared by a user and another user. In this system, data concerning basic objects constituting the virtual reality space is provided from an information server terminal to a client terminal of the user, and data concerning the avatar of the other user is provided from a shared server terminal to the client terminal, whereby the virtual reality space seen from a viewpoint of the one user, is displayed on a display device.

CITATION LIST

Patent Literature

[PTL 1]
U.S. Pat. No. 6,057,856 B

SUMMARY

Technical Problems

By constructing a system for allowing a plurality of users to participate in a virtual reality space, a service providing entity can provide various experiences to the plurality of users. For example, when a classroom in which a plurality of users participate is constructed as a virtual content space, each of the users can take classes together with the other users while being at home. Also, when a famous site or town in a foreign country is constructed as a virtual content space, a plurality of users can enjoy an overseas trip together. In the virtual content spaces, the users can freely move their own characters.

In order to entertain the users, the service providing entity sets various mechanisms in the virtual content spaces. Various types of mechanisms can be provided such as a mechanism for causing an object to receive attention to appear, a mechanism for generating an effective sound to increase a dramatic effect, and a mechanism for physically vibrating an input device carried about by a user. The service providing entity who sets such mechanisms, desires to confirm whether the mechanisms has effectively acted, that is, whether the set production, etc., has succeeded in attracting the user. Such information is helpful in improving the provided service, and leads to enhancement of attractiveness of the content.

The present invention has been made in view of these problems, and an object thereof is to provide a technique of processing user behavior history data.

Solution to Problems

In order to solve the aforementioned problems, an information processing device according to an aspect of the present invention includes: a behavior history data acquisition unit that acquires behavior history data on a plurality of users wearing head mounted displays on heads thereof and experiencing a same three-dimensional content space; a line-of-sight direction acquisition unit that acquires line-of-sight directions of the plurality of users in the three-dimensional content space, from the behavior history data on the plurality of users; and a screen generation unit that generates, on a basis of the acquired line-of-sight directions of the plurality of users, an image concerning line of sights of the plurality of users in a three-dimensional virtual space.

Another aspect of the present invention is an image generation method. The method includes: a step of acquiring behavior history data on a plurality of users wearing head mounted displays on heads thereof and experiencing a same three-dimensional content space; a step of acquiring line-of-sight directions of the plurality of users in the three-dimensional content space, from behavior history data on the plurality of users; and a step of generating, on a basis of the acquired line-of-sight directions of the plurality of users, an image concerning line of sights of the plurality of users in a three-dimensional virtual space.

Note that an arbitrary combination of the above constituent elements or an aspect obtained by converting an expression of the present invention to any one among a method, a device, a system, a computer program, a recording medium having the computer program recorded therein in a readable manner, and a data structure, etc., is also effective as an aspect of the present invention.

Advantage Effect of Invention

According to the present invention, a technique of processing user behavior history data can be provided.

BRIEF DESCRIPTION OF DRAWINGS

FIG. 9 is a diagram illustrating one example of a motion analysis screen.

FIG. 10 is a diagram illustrating another example of the motion analysis screen.

DESCRIPTION OF EMBODIMENT

Figure 1:
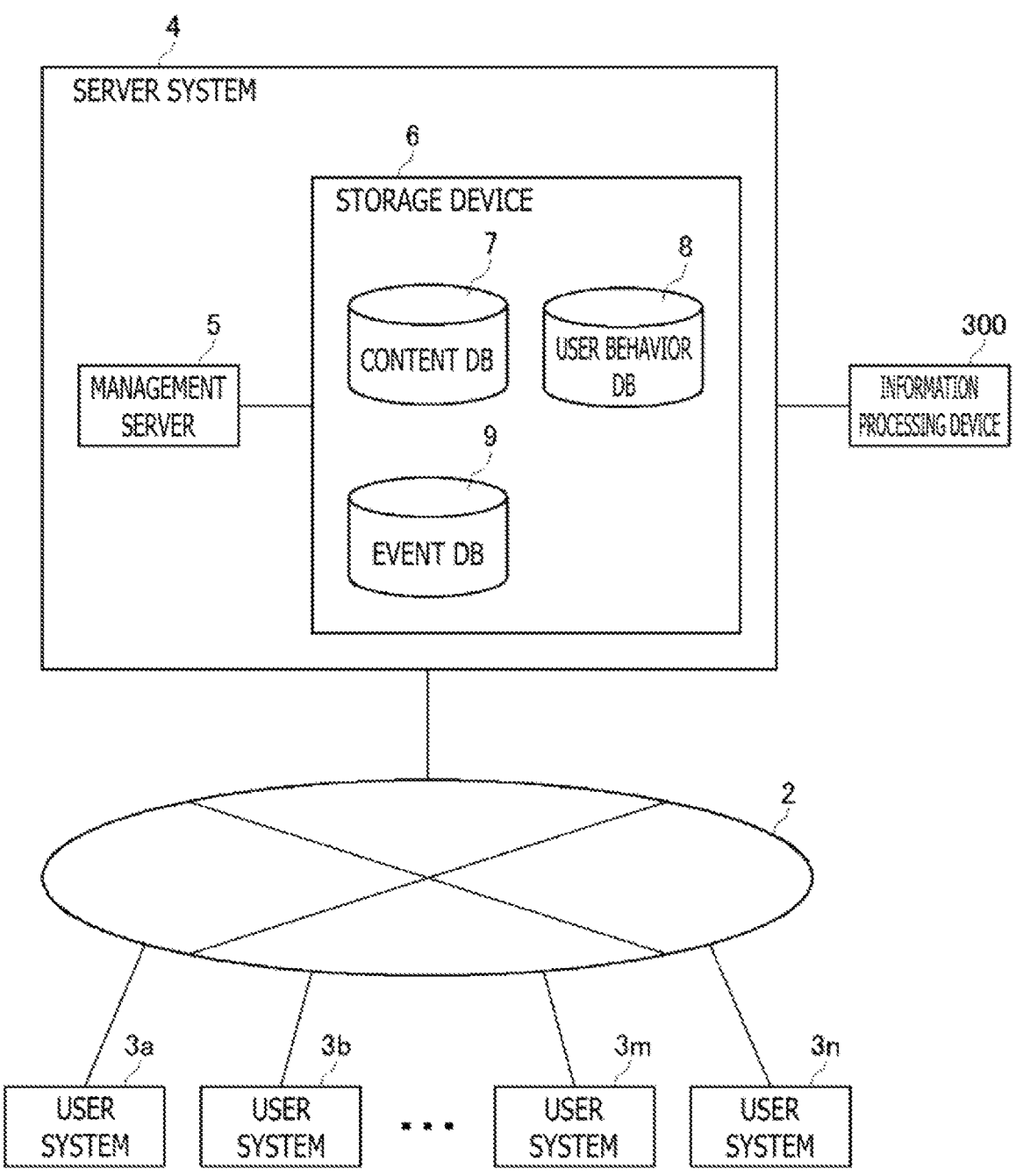
FIG. 1 is a diagram illustrating an information processing system of an embodiment.

FIG. 1 illustrates an information processing system 1 of an embodiment. The information processing system 1 provides a service for allowing a plurality of users to share a three-dimensional virtual space. The information processing system 1 includes a plurality of user systems 3a, 3b, . . . 3m, 3n (hereinafter, referred to as the "user systems 3" when being collectively referred), a server system 4, and an information processing device 300. The server system 4 is operated and managed by a providing entity of the service, and the user systems 3 are used by respective users. The information processing device 300 executes various processes including analysis, on the basis of behavior history data on each of the users of the service, under commission of the service providing entity.

The server system 4 and the plurality of user systems 3 are connected to a network 2 such as the Internet such that data exchange can be performed between the server system 4 and each of the user systems 3. Note that data exchange may be performed among the plurality of user systems 3.

The server system 4 includes a management server 5 and a storage device 6. The storage device 6 includes a content database (DB) 7 in which three-dimensional image data for generating a three-dimensional virtual space is held, a user behavior DB 8 in which information about behaviors of the users in the three-dimensional virtual space is accumulated, and an event DB 9 in which information about events generated in the three-dimensional virtual space is accumulated. Hereinafter, the three-dimensional image data held in the content DB 7 is referred to as "content data." In the embodiment, the server system 4 provides a three-dimensional virtual space of a city or a tourist spot to the user systems 3, an operator serves as a tour guide, and the plurality of users serve as tour participants, so that a service for allowing the plurality of users to enjoy a guided trip is provided.

The information processing device 300 acquires, from the server system 4, the user behavior history data accumulated in the user behavior DB 8 and the event information accumulated in the event DB 9. The information processing device 300 may acquire the accumulated data in the user behavior DB 8 and the event DB 9 by being connected to the server system 4 online. However, when being not connected to the server system 4, the information processing device 300 acquires the accumulated data in the user behavior DB 8 and the event DB 9 offline.

The server system 4 provides a service for allowing the plurality of users to share a three-dimensional content space. The content data stored in the content DB 7 basically includes static object data the positional information or attitude information of which is not updated. For example, content data for expressing a virtual space of a tourist spot is configured so as to include a building object, a road object, a street lamp object, and a sign object, etc., a relative positional relation among which has been defined. Note that an object that can be moved by the users may exist in the virtual space.

Before receiving provision of the service, the user systems 3 each install a viewer application for reproducing the content data. When the user systems 3 each download the content data from the server system 4 via the network 2, the viewer application constructs a virtual space based on the content data, moves characters in the virtual space on the basis of operation information from the users, and renders the virtual space according to the positions and attitudes (line-of-sight directions) of user characters. Accordingly, through the user characters, the users can freely move in the virtual space and can see an image from free viewpoints.

Figure 2:
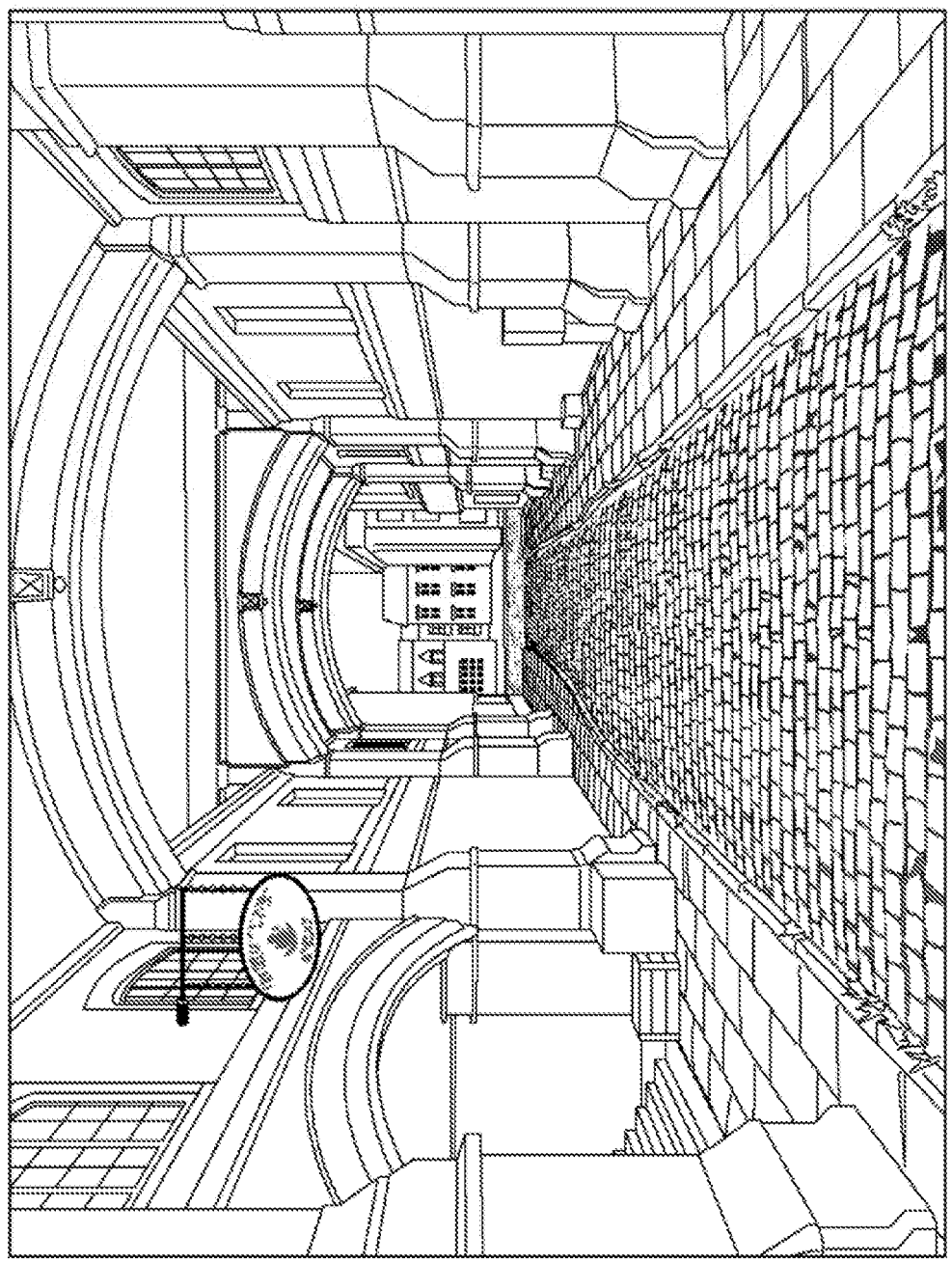
FIG. 2 is a diagram illustrating one example of an image of a virtual space.

FIG. 2 illustrates one example of an image of a virtual space seen from a viewpoint of a certain user character. The viewer application generates an image seen from the viewpoint of the user character according to the position and line-of-sight direction of the user character.

Each of the user systems 3 downloads the content data, so that the virtual space is shared by the plurality of users. Hereinafter, an example in which ten users A, B, C, D, E, F, G, H, I, and J share the virtual space will be described. The management server 5 takes charge of a virtual space sharing process for the plurality of users. The users operate the respective user characters in the virtual space. The operation information therefor is used for processes to be executed by the viewer application in the user system 3 of the corresponding user, and is transmitted to the management server 5. The management server 5 transfers the operation information to the user systems 3 of the other users. That is, operation information about an operation executed for the character of the user A by the user A is provided to the user systems 3 of the other nine users B to J to be used for respective processes to be executed by the viewer application in the user systems 3. Since the operation information for the character from each user is shared by all the users, as described above, the user characters of all the users A to J each basically exhibit the same behavior in the user systems 3, unless there is no influence of a communication delay.

Figure 3:
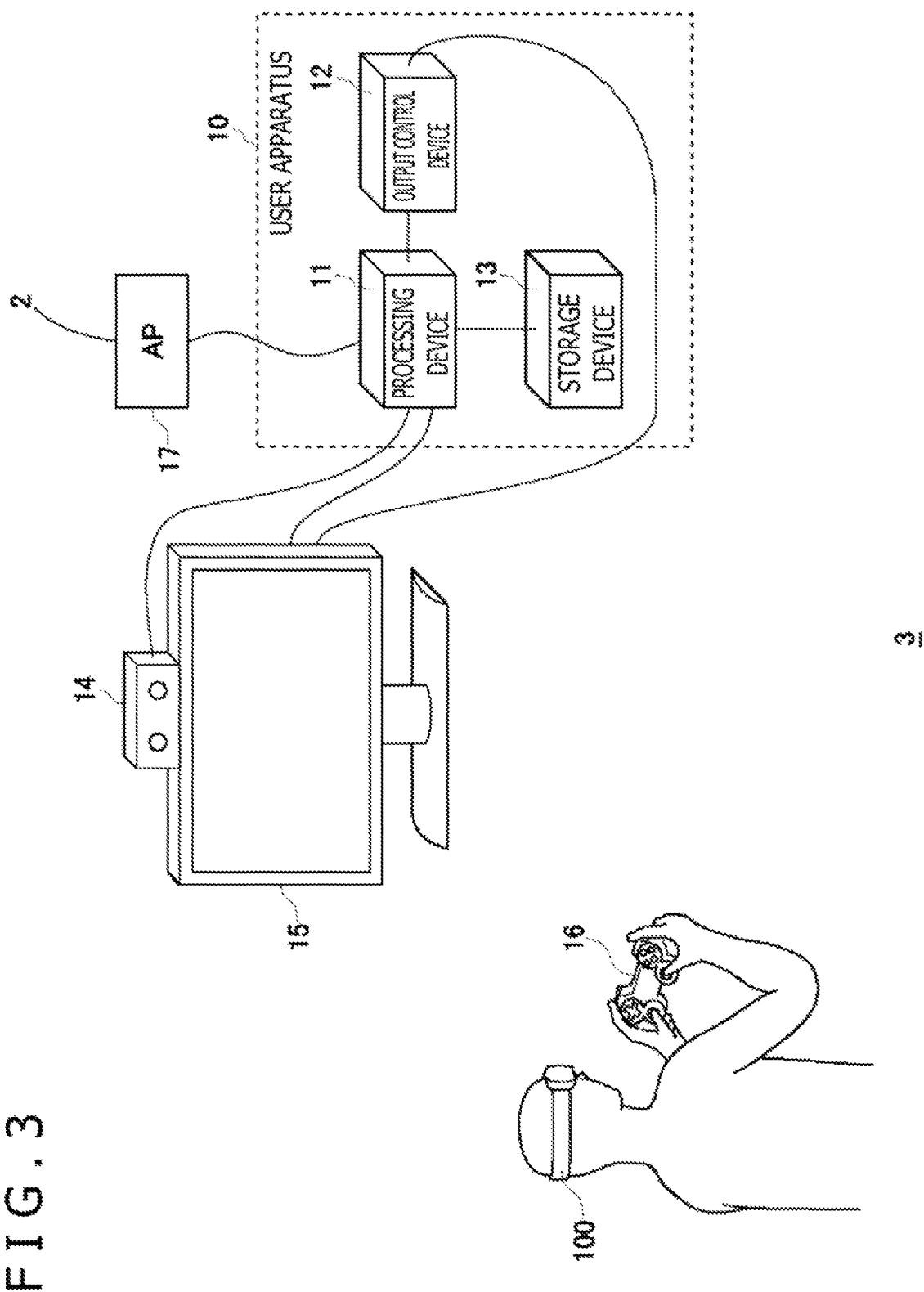
FIG. 3 is a diagram illustrating a configuration example of a user system of the embodiment.

FIG. 3 illustrates a configuration example of the user system 3 of the embodiment. The user system 3 includes a user apparatus 10, a head mounted display device (HMD) 100, an input device 16 which is operated by user's fingers, an imaging device 14 which photographs a user, and an output device 15 which displays an image. The user apparatus 10 is connected to the network 2 via an access point (AP) 17. The AP 17 has a wireless access point function and a router function. The user apparatus 10 may be connected to the AP 17 via a cable, or may be connected to the AP 17 in accordance with a known wireless communication protocol.

The HMD 100 is mounted on a head of the user, and provides a virtual reality (VR) world to the user. The HMD 100 has a head tracking function, and can enhance a sense of immersion to a video image world by updating a display screen in conjunction with motion of the head of the user. Note that an image obtained by rendering is displayed on display panels of the HMD 100 in the embodiment, but the image obtained by rendering may be displayed on the output device 15.

The user apparatus 10 includes a processing device 11, an output control device 12, and a storage device 13. The processing device 11 is a terminal device that executes the viewer application upon receiving operation information inputted to the input device 16 by the user. The processing device 11 and the input device 16 may be connected via a cable, or may be connected in accordance with a known wireless communication protocol. Note that the processing device 11 of the embodiment also has a function of executing the viewer application upon receiving attitude information about the HMD 100 as user operation information for the viewer application. The output control device 12 is a processing unit that outputs image data generated by the processing device 11 to the HMD 100. The output control device 12 and the HMD 100 may be connected via a cable, or may be connected in accordance with a known wireless communication protocol.

The imaging device 14, which is a stereo camera, photographs the user wearing the HMD 100 at a predetermined cycle, and supplies the photographed images to the processing device 11. The HMD 100 is provided with markers (tracking light emitting diodes (LEDs)) for tracking the user's head, which will be described later, and the processing device 11 detects motion of the HMD 100 on the basis of positions of the markers included in the photographed images. Note that attitude sensors (an acceleration sensor and a gyro sensor) are installed in the HMD 100, and the processing device 11 acquires sensor data detected by the attitude sensors from the HMD 100, so that a highly accurate tracking process is executed along with use of the images obtained by photographing the markers. Note that various schemes have been conventionally proposed for a tracking process. The processing device 11 may adopt any tracking scheme as long as the motion of the HMD 100 can be detected.

In the user system 3 of the embodiment, the viewer application for providing an image seen from the viewpoint of the user character to the HMD 100 is executed. In the embodiment, since the user sees the image through the HMD 100, the output device 15 is not necessarily required in the user system 3. However, in a modification, the user does not wear the HMD 100, and the output control device 12 or the processing device 11 may output an image through the output device 15.

The HMD 100 is a display device displaying images on the display panels positioned in front of eyes of the user, when being mounted on the user's head. In the HMD 100, a left-eye image is displayed on a left-eye display panel, and a right-eye image is displayed on a right-eye display panel, separately. These images constitute a parallax image seen from the left and right view points so as to realize stereoscopic vision. Note that, since the user sees the display panels through optical lenses, the user apparatus 10 supplies, to the HMD 100, parallax image data in which an optical distortion due to the lenses has been corrected. Either the processing device 11 or the output control device 12 may execute the optical distortion correction process.

The processing device 11, the storage device 13, the output device 15, the input device 16, and the imaging device 14 may constitute a conventional game system. In this case, the processing device 11 is a game device executing a game, and the input device 16 is a device such as a game controller, a keyboard, a mouse, or a joystick, the device supplying operation information from the user to the processing device 11. As a result of addition of the output control device 12 and the HMD 100 as components of the game system, the user system 3 executing a VR viewer application is constructed.

Note that the function to be exerted by the output control device 12 may be included, as a part of the function of the viewer application, in the processing device 11. That is, the processing unit of the user apparatus 10 may be formed of the processing device 11 alone, or may be formed of the processing device 11 and the output control device 12. Hereinafter, the functions of the processing device 11 and the output control device 12 necessary for executing the viewer application will be collectively described as the functions of the user apparatus 10.

At a step prior to execution of the viewer application, the processing device 11 downloads, into the storage device 13, content data stored in the storage device 6 of the server system 4. Further, the user sets an own character when starting the viewer application. Data on the set user character is stored in the storage device 13, is transmitted to the server system 4, and is transmitted from the server system 4 to the user systems 3 of the other users.

The viewer application moves the user character in the virtual space on the basis of operation information inputted from the input device 16, and determines the line-of-sight direction of the user character on the basis of attitude information about the HMD 100 mounted on the head of the user. In the embodiment, the viewer application uses the attitude information about the HMD 100 as operation information for operating the line-of-sight direction of the user character. Alternatively, the viewer application may use, as operation information for operating the line-of-sight direction, information inputted to the input device 16. Further, for operation information for moving the user character, not input information from the input device 16 but the positional information about the HMD 100 may be used. In the embodiment, the operation information for the user character may be acquired from either the input device 16 or the HMD 100, or may be acquired from another user interface.

The user apparatus 10 detects position coordinates and an attitude of the user's head (actually, the HMD 100) by executing a user head tracking process. Here, the position coordinates of the HMD 100 are position coordinates (x, y, z) in a three-dimensional space with a reference position as an origin. The reference position may be defined by the position coordinates ($x_0$, $y_0$, $z_0$) when the HMD 100 is turned on. Further, the attitude of the HMD 100 is defined by the inclinations thereof in three axis directions (yaw, roll, pitch) with respect to a reference attitude in the three-dimensional space. Note that the reference attitude is an attitude when the line-of-sight direction of the user is horizontal, and the reference orientation may be set when the HMD 100 is turned on.

The user apparatus 10 can detect the position coordinates (x, y, z) and the attitude (yaw, roll, pitch) of the HMD 100 only from the sensor data detected by the attitude sensors of the HMD 100, and further, can detect the position coordinates and the attitude of the HMD 100 with high accuracy through image analysis of the markers (tracking LEDs) of the HMD 100 photographed by the imaging device 14. The user apparatus 10 may calculate the position of the user character in the virtual space on the basis of the positional information about the HMD 100, and calculate the line-of-sight direction of the user character on the basis of the attitude information about the HMD 100, as described above. However, in the embodiment, the position of the user character in the virtual space is calculated on the basis of the operation information from the input device 16.

Figure 4:
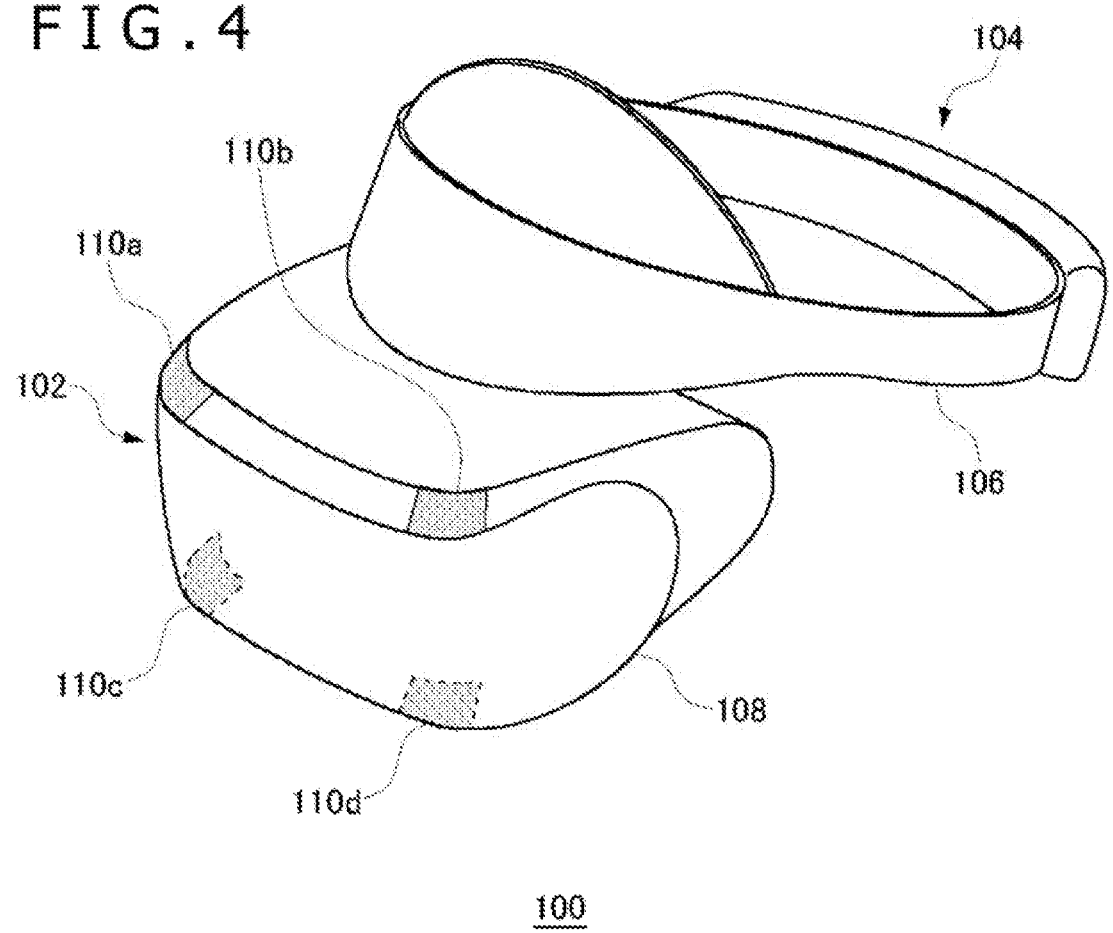
FIG. 4 is a diagram illustrating an external shape example of an HMD.

FIG. 4 illustrates an external shape example of the HMD 100. The HMD 100 is formed of an output mechanism part 102 and a wearing mechanism part 104. The wearing mechanism part 104 incudes a wearing band 106 which, when being worn by a user, is disposed around a head so as to fix the HMD 100 to the head. The wearing band 106 has a raw material or a structure a length of which is adjustable according to a circumference of the head of the user.

The output mechanism part 102 includes a casing 108 having a shape to cover the left and right eyes in a state where the user is wearing the HMD 100, and includes therein display panels which directly face the eyes during wearing. The display panels may be liquid crystal panels, organic electroluminescence (EL) panels, or the like. In the casing 108, a pair of left and right optical lenses which are positioned between the display panels and the user's eyes and which expand the view angle of the user, are further provided. The HMD 100 may be further provided with a speaker or an earphone at a position corresponding to an ear of the user.

Light emitting markers 110a, 110b, 110c, and 110d are provided on an outer surface of the casing 108. The tracking LEDs constitute the light emitting markers 110 in this example, but other types of markers may be used. In either case, it is sufficient as long as the markers can be photographed by the imaging device 14 and the user apparatus 10 can perform image analysis of the marker positions. Although no particular limitation is put on the number and arrangement of the light emitting markers 110, the number and the arrangement need to be set so as to enable detection of the attitude of the HMD 100. In the illustrated example, the light emitting markers 110 are provided at four corners of a front surface of the casing 108. Moreover, in order to enable photographing even when the user turns his/her back toward the imaging device 14, the light emitting markers 110 may be provided on side portions and a rear portion of the wearing band 106.

The HMD 100 may be connected to the user apparatus 10 via a cable, or may be connected to the user apparatus 10 in accordance with a known wireless communication protocol. The HMD 100 transmits sensor data detected by the attitude sensors to the user apparatus 10, and further, receives image data generated by the user apparatus 10 and displays the images on the left-eye display panel and the right-eye display panel.

Figure 5:
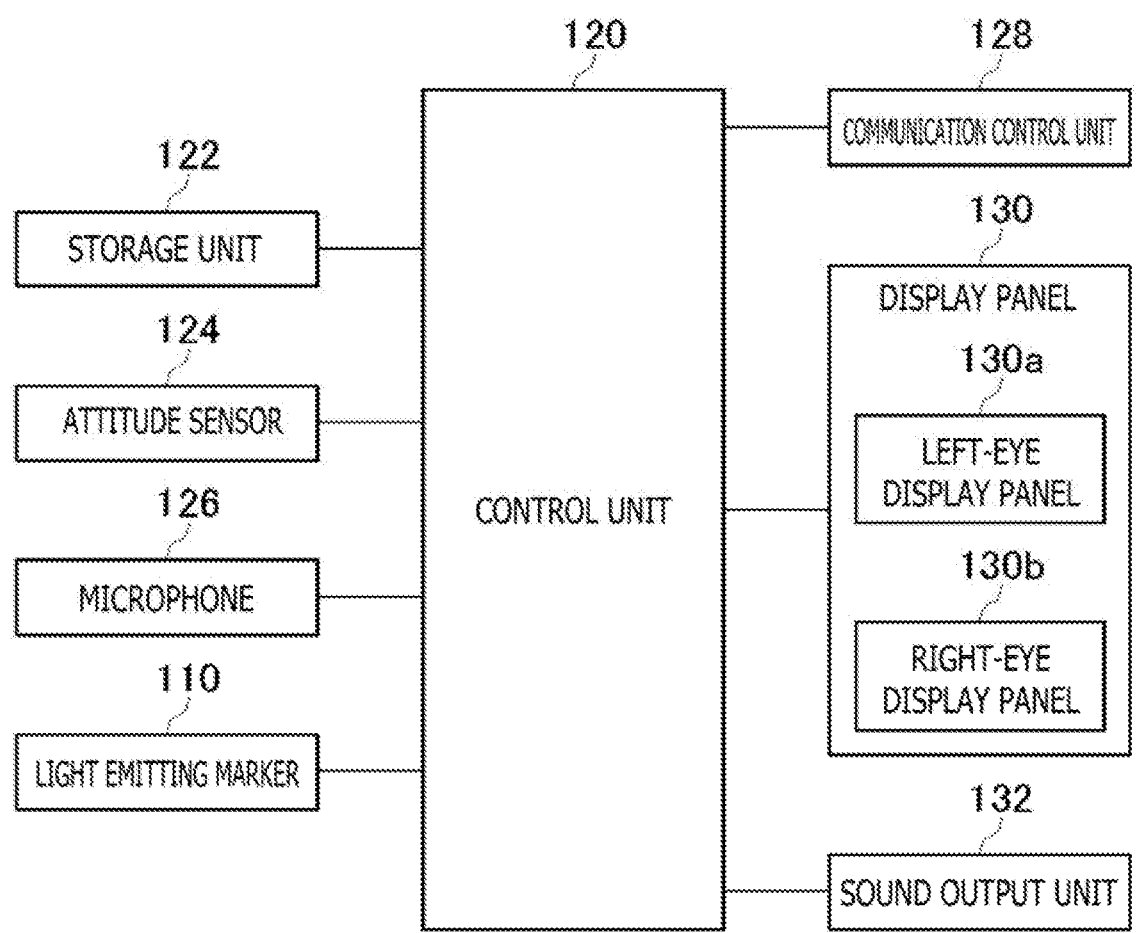
FIG. 5 is a diagram illustrating functional blocks of the HMD.

FIG. 5 illustrates functional blocks of the HMD 100. A control unit 120 is a main processor that processes a command or various data such as image data, sound data, or sensor data to be output. A storage unit 122 temporarily stores the data and the command to be processed by the control unit 120. Attitude sensors 124 detect the attitude information about the HMD 100. The attitude sensors 124 include at least a three-axis acceleration sensor and a three-axis gyro sensor.

A communication control unit 128 transmits, to the user apparatus 10 external thereto, data outputted from the control unit 120 through wired or wireless communication via a network adaptor or an antenna. Also, the communication control unit 128 receives data from the user apparatus 10 through wired or wireless communication via a network adaptor or an antenna, and outputs the data to the control unit 120.

Upon receiving the image data or the sound data from the user apparatus 10, the control unit 120 supplies the data to display panels 130 so as to cause the display panels 130 to display the data, while also supplying the data to a sound output unit 132 so as to cause the sound output unit 132 to output the sound of the data. The display panels 130 include a left-eye display panel 130a and a right-eye display panel 130b, and a pair of parallax images are displayed on the display panels. In addition, the control unit 120 causes the communication control unit 128 to transmit the sensor data received from the attitude sensors 124 or the sound data received from a microphone 126 to the user apparatus 10.

Figure 6:
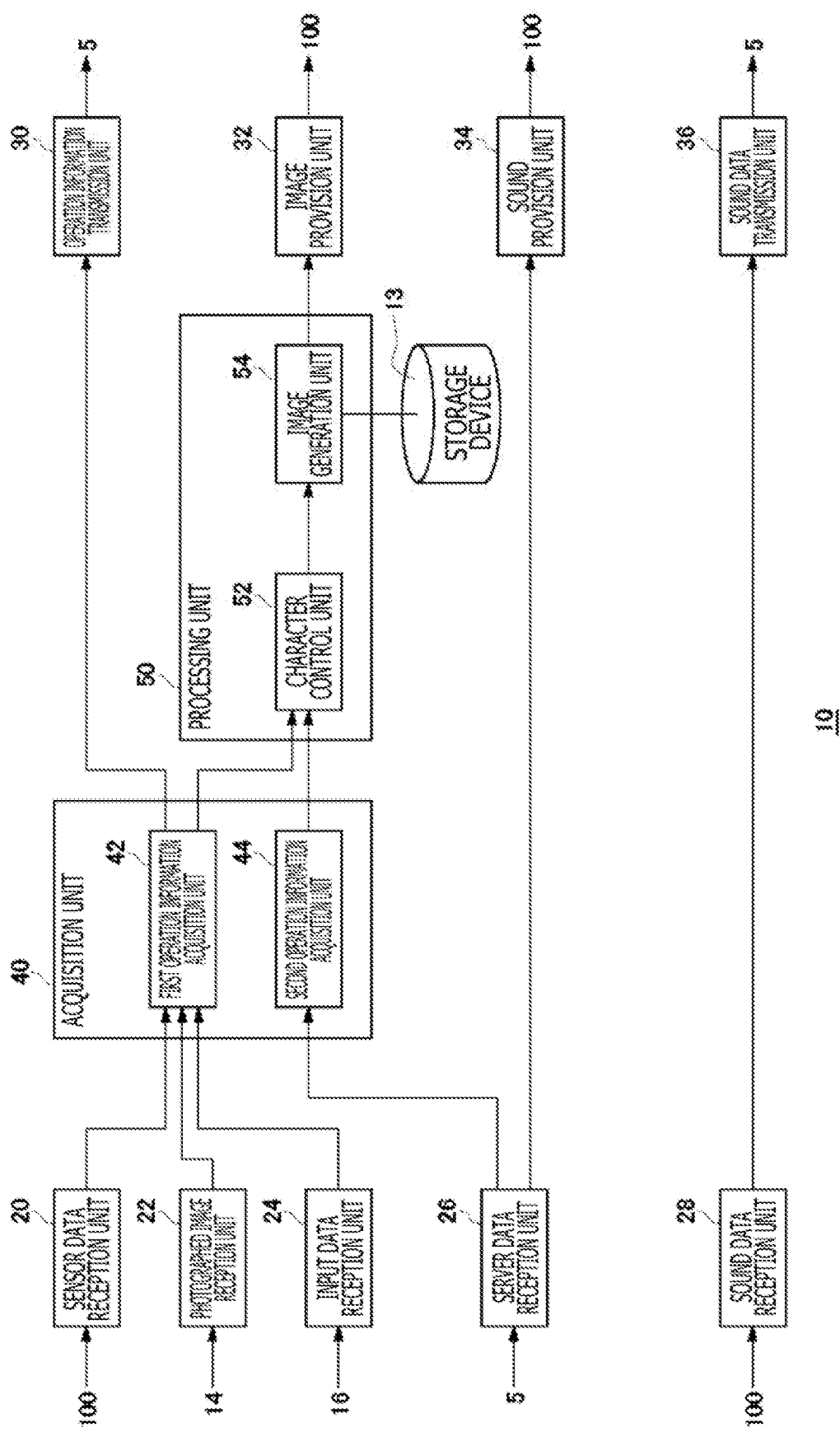
FIG. 6 is a diagram illustrating functional blocks of a user apparatus.

FIG. 6 illustrates the functional blocks of the user apparatus 10. The user apparatus 10 includes, as input/output interfaces with respect to the outside, a sensor data reception unit 20, a photographed image reception unit 22, an input data reception unit 24, a server data reception unit 26, a sound data reception unit 28, an operation information transmission unit 30, an image provision unit 32, a sound provision unit 34, and a sound data transmission unit 36. The server data reception unit 26 is a communication interface through which data transmitted from the management server 5 is received.

The user apparatus 10 further includes an acquisition unit 40, a processing unit 50, and the storage device 13. The acquisition unit 40 has a function of acquiring, from the data received through the input/output interfaces, information to be used by the viewer application, and includes a first operation information acquisition unit 42 and a second operation information acquisition unit 44. The processing unit 50 has a function of generating image data from the information acquired by the acquisition unit 40, and includes a character control unit 52 and an image generation unit 54. The storage device 13 stores content data for constructing the three-dimensional virtual space, data on the character of the user using the user apparatus 10, data on the characters of the other users, and the like.

In FIG. 6, components executing various processes as the functional blocks can be each configured by a circuit block, a memory, or another large-scale integration (LSI) in terms of hardware, and can be each achieved by a program or the like loaded in a memory in terms of software. Therefore, a person skilled in the art will understand that the functional blocks can be implemented in various forms using hardware only, software only, or a combination thereof. The functional blocks are not limited to one of them.

Hereinafter, operation of the user apparatus 10 which is used by the "user A" will be described. The first operation information acquisition unit 42 acquires operation information for moving the character of the user A in the virtual space. On the other hand, the second operation information acquisition unit 44 acquires operation information for moving the characters of users other than the user A, that is, the users B, C, D, E, F, G, H, I, and J in the virtual space.

Note that, in the user apparatus 10 which is used by the "user B," the first operation information acquisition unit 42 acquires operation information for moving the character of the user B, and the second operation information acquisition unit 44 acquires operation information for moving the characters of the users other than the user B.

Hereinafter, operation information from the user A will be described.

The sensor data reception unit 20 receives sensor data at a predetermined cycle from the attitude sensors 124 of the HMD 100 mounted on the user A, and supplies the sensor data to the first operation information acquisition unit 42. The photographed image reception unit 22 receives, from the imaging device 14, images obtained by photographing the HMD 100 at a predetermined cycle, and supplies the images to the first operation information acquisition unit 42. For example, the imaging device 14 photographs a forward space every (1/60) second, and the photographed image reception unit 22 receives the photographed image every (1/60) second. The input data reception unit 24 receives, from the input device 16, key data inputted by the user A, and supplies the key data to the first operation information acquisition unit 42.

The first operation information acquisition unit 42 detects a change in the attitude of the HMD 100 on the basis of the motion of the HMD 100 mounted on the head of the user, thereby acquires operation information indicating a change in the line-of-sight direction of the character of the user A in the virtual space. Specifically, the first operation information acquisition unit 42 detects the change in the attitude of the HMD 100 on the basis of the sensor data obtained by the attitude sensors 124. The first operation information acquisition unit 42 may specify the change in the attitude of the HMD 100 on the basis of the sensor data obtained by the three-axis gyro sensor. Note that the first operation information acquisition unit 42 preferably increases an accuracy of detecting the attitude change by additionally using a result of photographing of the tracking light emitting markers 110. The first operation information acquisition unit 42 acquires, from the detected change in the attitude of the HMD 100, the operation information indicating the change in the line-of-sight direction of the user A.

Also, the first operation information acquisition unit 42 acquires an operation information indicating a movement amount and a movement direction of the character of the user A in the virtual space on the basis of the key data received by the input data reception unit 24 from input device 16. A known technology may be used for a process for moving the character in the virtual space through an operation performed on the input device 16. In the embodiment, since the user A is wearing the HMD 100, the line-of-sight direction of the character is set so as to match the line-of-sight direction of the user A wearing the HMD 100. However, a mode in which the user A is not wearing the HMD 100 may be assumed as a modification. In this case, the user A may input, through the input device 16, key data for controlling the position and the line-of-sight direction of the character.

As described above, the first operation information acquisition unit 42 acquires the operation information for moving the character of the user A in the virtual space. The operation information may specify the change amounts of the position and the line-of-sight direction, or may directly specify the position and the line-of-sight direction. The first operation information acquisition unit 42 supplies the operation information for moving the character of the user A to the character control unit 52. What type of operation information is acquired by the first operation information acquisition unit 42 depends on the viewer application. In any case, any type of operation information can be used as long as the operation information can be processed by the character control unit 52. The first operation information acquisition unit 42 may generate the operation information at a predetermined cycle, and supply the operation information to the character control unit 52. However, when a state change is generated, that is, when the attitude of the HMD 100 is changed or when a key input is generated on the input device 16, the first operation information acquisition unit 42 may generate the operation information, and supply the operation information to the character control unit 52.

The character control unit 52 controls motion of the character of the user A in the virtual space, or specifically, the position and the line-of-sight direction of the character on the basis of the operation information supplied from the first operation information acquisition unit 42.

The image generation unit 54 executes three-dimensional rendering on the virtual space on the basis of the position (three-dimensional virtual space coordinate values) of the user character in the virtual space. Specifically, the image generation unit 54 places, at the position of the user character, a virtual camera an optical axis of which is in the line-of-sight direction of the user character, and generates image data. The image provision unit 32 outputs the generated image data to the HMD 100.

In the viewer application of the embodiment, the user A can move the character by performing a key input on the input device 16, and can change the line-of-sight direction of the character by inclining the head so as to change the direction of the HMD 100. Images corresponding to the position and the line-of-sight direction of the character are displayed on the display panels 130 of the HMD 100 (see FIG. 2).

Control of motion of the character of the user A has been described above. The information processing system 1 of the embodiment provides a service for allowing a plurality of users to share a three-dimensional virtual space. Thus, the operation information for the character of the user A acquired by the first operation information acquisition unit 42 is transmitted from the operation information transmission unit 30 to the management server 5, and is transferred from the management server 5 to the user apparatuses 10 of the other users B to J.

The user apparatuses 10 of the other users B to J also acquire operation information for moving the characters of the corresponding users, and transmit the operation information to the management server 5. The management server 5 transmits, to the user apparatus 10 of the user A, the character operation information acquired by the user apparatuses 10 of the other users B to J. The server data reception unit 26 receives the operation information for the characters of the other users transmitted from the management server 5.

The management server 5 manages information about the users participating in the virtual content space sharing service. The user information includes at least user accounts for identifying the users, and character data of the users. Prior to start of the service, the management server 5 transmits the user information about the participating users to the user apparatuses 10 of all the participating users. After start of the service, the management server 5 transmits operation information for the user characters in association with the corresponding user accounts, to the user apparatuses 10. Accordingly, the user apparatuses 10 each can specify on which user's character motion the operation information received at the server data reception unit 26 is to be reflected.

The second operation information acquisition unit 44 acquires, from the server data reception unit 26, operation information for moving the characters of the other users B to J, and supplies the operation information to the character control unit 52. The character control unit 52 controls motions of the characters of the other users, or specifically, the positions and the line-of-sight directions of the characters in the virtual space on the basis of the operation information supplied from the second operation information acquisition unit 44. Control of the line-of-sight direction of a character is implemented by control of the direction of a neck of the character.

As described above, the image generation unit 54 generates an image of the virtual space seen from the line-of-sight direction of the character on the basis of the position of the character of the user A. Thus, when the visual field of the character of the user A includes the character of another user, the image generation unit 54 generates image data including the character of the other user who is different from the user A. The image provision unit 32 outputs the generated image data to the HMD 100 which is a display device. The sound data reception unit 28 receives sound data of the user A inputted to the microphone 126 of the HMD 100, and the sound data transmission unit 36 transmits the sound data of the user A to the management server 5.

Figure 7:
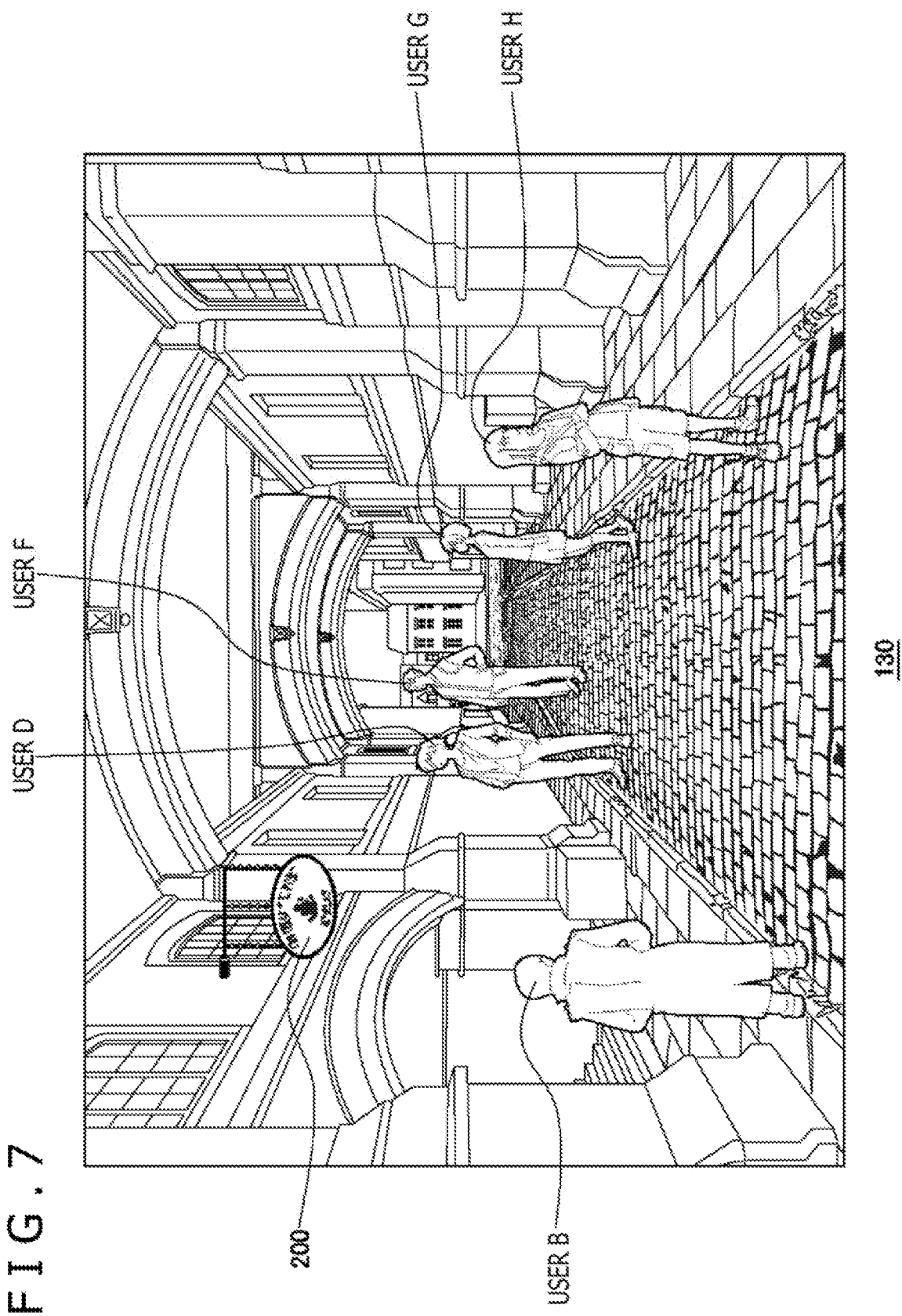
FIG. 7 is a diagram illustrating one example of an image of a virtual space.

FIG. 7 illustrates one example of an image of the virtual space seen from the viewpoint of the character of the user A. FIG. 7 illustrates the state where the view field of the character of the user A includes the characters of five users. The user characters are assumed to be the character of the user B, the character of the user D, the character of the user F, the character of the user G, and the character of the user H, in order from left. Note that the characters of the other users C, E, I, and J are not present in the view angle of the character of the user A because the characters of the other users are behind the character of the user A or are inside a building, for example, and thus, these characters are not included in the image data. In the HMD 100, the communication control unit 128 receives image data from the user apparatus 10, and the control unit 120 displays the virtual space images on the display panels 130.

In the embodiment, the server system 4 provides a virtual space of a tourist spot to the plurality of user systems 3, the operator of the server system 4 serves as a tour guide, and the plurality of users serve as tour participants, so that a service for allowing the plurality of users to take a guided tour together is provided. The operator operates the management server 5 to distribute sound guides to the user systems 3, and specifies, by using sounds, the direction toward which the users move or a target (object) to receive attention of the users. In each of the user systems 3, when the server data reception unit 26 receives the sound data for sound guidance, the sound provision unit 34 transmits the sound data to the HMD 100. In the HMD 100, the communication control unit 128 receives the sound data, and the control unit 120 outputs the sound guidance to an earphone (not illustrated) through the sound output unit 132.

When an object to receive attention exists in this virtual space, the operator serving as the tour guide executes sound guidance such that attention is paid to the object. The sound guide may be a speech of "please pay attention to the sign on a side of the road." An "explanation event" is started with this sound guidance. In the screen example shown in FIG. 7, an object 200 is set as an object to receive attention. Next, the operator gives an explanation of an interesting point (e.g., a history of a store having the sign) of the object 200. When the explanation of the interesting point is ended, the explanation event is ended, and then, guidance for movement to a next object to receive attention is performed. Note that the explanation event may be started and ended by the operator at arbitrary timings. The start and end timing of the event is stored in the event DB 9.

Note that, in the embodiment, the operator of the server system 4 manages an event for which the sound guide is to be distributed, while watching the states of the tour participants. However, for example, the sound guide may be managed so as to be distributed at a predetermined time. That is, the operator does not manage events, but sightseeing places and times of the tour may be previously programmed such that various events and productions such as sound guides are implemented in accordance with the program. In this case, the event DB 9 stores details of a predetermined event common in the tour and a generation time of the event.

When the sound guidance "please pay attention to the sign on a side of the road" is executed, the users move the line of sights in order to find the sign (object 200) on a side of the road in the virtual space. For the service providing entity side, when all the participants are caused to efficiently (in a short time) pay attention to the object 200, a tour having a high service value can be implemented. Accordingly, the service providing entity desires to ascertain what guidance, in other words, what production succeeds in causing the tour participants to pay attention to the object 200.

Therefore, the information processing device 300 analyzes the behaviors of the tour participants on the basis of the user behavior history data stored in the user behavior DB 8. When trying to cause the participants to pay attention to a certain object 200, the service providing entity desires to know a type of the most effective sound guidance for causing the tour participants to pay attention to the object 200 by adjusting various parameters such as details of a sound guidance message, a speaking manner, a sound volume, and a gender of a speaker. The information processing device 300 has a function of executing various analyses according to the desire of the service providing entity described above on the basis of the user behavior history data stored in the user behavior DB 8.

Figure 8:
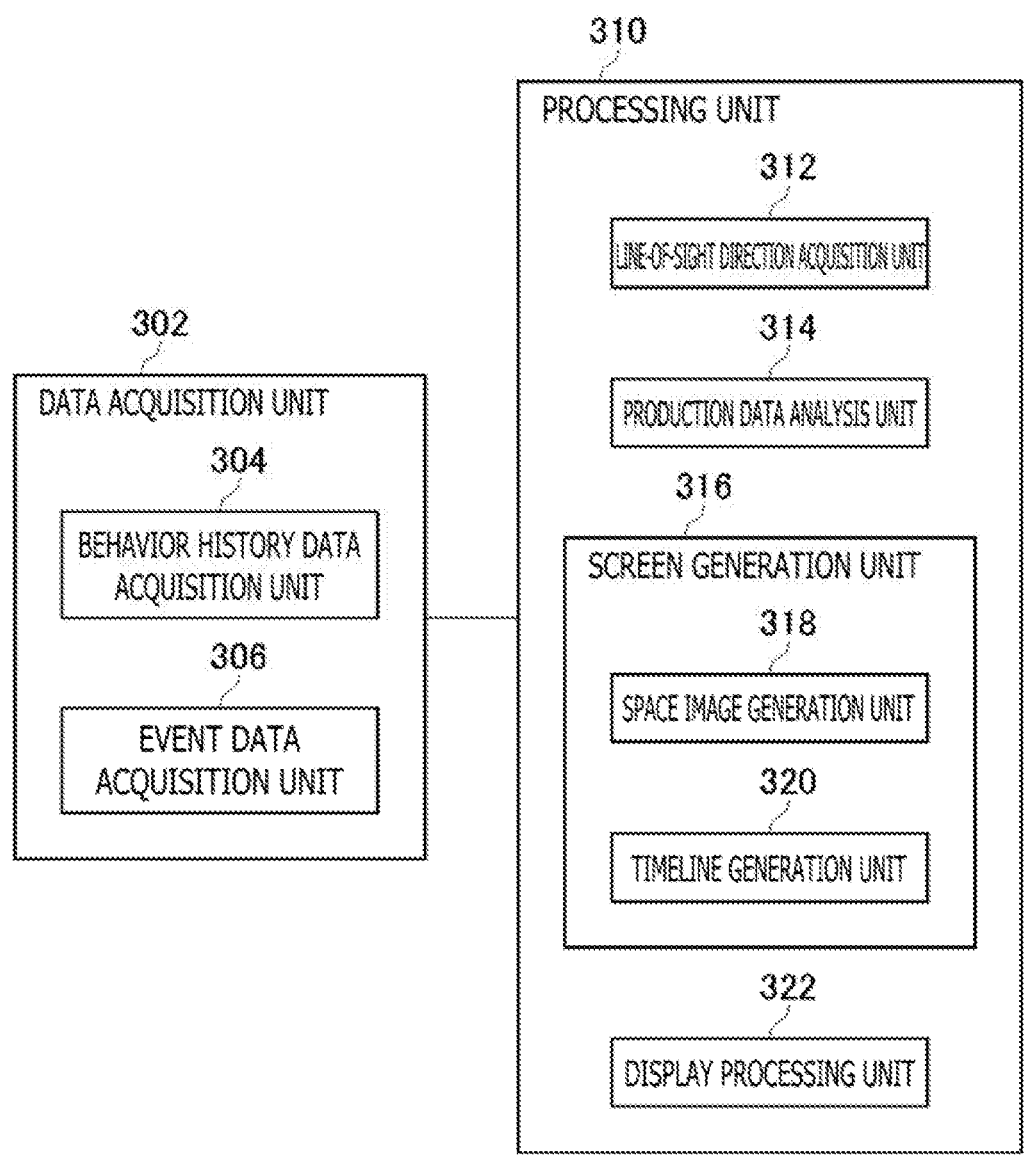
FIG. 8 is a diagram illustrating a configuration of an information processing device.

FIG. 8 illustrates the configuration of the information processing device 300. The information processing device 300 includes a data acquisition unit 302 that acquires data from the server system 4, and a processing unit 310 that processes the acquired data. The data acquisition unit 302 includes a behavior history data acquisition unit 304 that acquires the behavior history data on the plurality of users accumulated in the user behavior DB 8, and an event data acquisition unit 306 that acquires the event data accumulated in the event DB 9. Note that data on productions implemented in the three-dimensional virtual content space is recorded, together with time information thereof, in the event DB 9, and the event data acquisition unit 306 acquires the production data accumulated in the event DB 9. The data acquisition unit 302 may acquire various types of accumulated data from the management server 5 through online connection with the server system 4, or may acquire various types of accumulated data from a recording medium having the data recorded therein.

The processing unit 310 includes a line-of-sight direction acquisition unit 312 that derives the line-of-sight directions of the plurality of users in the three-dimensional content space, a production data analysis unit 314 that analyzes the production data, a screen generation unit 316 that generates a screen indicating a state of the three-dimensional virtual space, and a display processing unit 322 that displays, on a display, the screen generated by the screen generation unit 316. The screen generation unit 316 includes a space image generation unit 318 that generates an image concerning the line of sights of the users in the three-dimensional virtual space, and a timeline generation unit 320 that generates a timeline image indicating an analysis result of the production data and the like.

From the user behavior DB 8, the behavior history data acquisition unit 304 acquires the following data.
(A1) User Profile Data The user profile data is gender and age data to be used for content analysis and/or user action analysis, and data for specifying an individual is not required therefor. The user profile data is registered in the management server 5, and the management server 5 stores, in the user behavior DB 8, data obtained by including the profile data in the user behavior history data on each user.

Note that the user profile data may be automatically generated at each of the user systems 3, and be transmitted to the server system 4. When the user starts the user apparatus 10, the imaging device 14 photographs the user before the user wears the HMD 100. The photographed image obtained by photographing the user who is not wearing the HMD 100 is supplied to the processing device 11. The processing device 11 estimates the gender and the age of the user by image analysis processing. The estimated gender and age may be transmitted, as the user profile data, to the management server 5, and the management server 5 may store the profile data in the user behavior DB 8.
(A2) Operation Information for Characters As described above, the user apparatuses 10 of the respective users transmit operation information for the corresponding characters to the server system 4, and the management server 5 stores, in the user behavior DB 8, the operation information for the user characters in the three-dimensional content space as user behavior history data.
(A3) User State Detection Information The user systems 3 each detect the state of the user who is enjoining a virtual tour, and transmit a state to the server system 4. The user systems 3 each detect state information such as a temperature, brain waves, and pulse, etc., of the user, and transmit the state detection information to the server system 4. The state information may be periodically detected. The management server 5 stores, in the user behavior DB 8, the state detection information as user behavior history data.
(A4) User Sound Data In each of the user systems 3, the sound data transmission unit 36 transmits, to the server system 4, sound data inputted to the microphone 126 of the HMD 100, and the management server 5 stores, in the user behavior DB 8, the user sound data as user behavior history data.

From the event DB 9, the event data acquisition unit 306 acquires the following data.
(B1) Event Data The event data includes data for specifying details of an event, and start and end timings of the event.
(B2) Production Data The production data includes data for specifying details of a production, and start and end timings of the production. For example, the production data includes background music (BGM) to be reproduced in the three-dimensional content space, drive data for driving a vibrator included in the input device 16 of the user, and the like.

The processing unit 310 analyzes actions of the plurality of users experiencing the same three-dimensional content space. For example, regarding a tour details of which are preliminarily programmed, that is, a tour in which an event is generated invariably at a fixed time, the same three-dimensional content space is provided each time the tour is conducted. Therefore, the processing unit 310 can analyze the actions of all the users participating in the tour, from the behavior history data on the users.

Meanwhile, in the case where the operator guides tours, as described in the embodiment, the processing unit 310 performs, for each tour, action analysis along a time axis because an event generation time varies according to the tours. Note that the processing unit 310 may analyze, from the behavior history data on all the users participating in the tour, a user action such as a user reaction to an event, which does not need to be analyzed along the time axis.

The behavior history data acquisition unit 304 acquires behavior history data on the plurality of users wearing the HMDs 100 on the heads thereof and experiencing the same three-dimensional content space. The line-of-sight direction acquisition unit 312 acquires the positions and line-of-sight directions of the plurality of users in the three-dimensional content space, from the behavior history data on the plurality of users. The space image generation unit 318 generates, on the basis of the acquired positions and line-of-sight directions of the plurality of users, an image concerning the line-of-sight directions of the plurality of users in the three-dimensional virtual space.

FIG. 9 illustrates one example of an action analysis screen 330 generated by the screen generation unit 316. The space image generation unit 318 generates a space image in which line-of-sight indicators 342a to 342d indicating the line-of-sight directions of users are arranged and rendered in a three-dimensional virtual space 340 corresponding to the three-dimensional content space. The viewpoint of the space image can be switched by an operation of a user interface.

Note that the example in which ten users participate in the tour has been described in the embodiment, but the example illustrated in FIG. 9 illustrates line-of-sight indicators 342a to 342d of four users, for convenience. Here, the line-of-sight indicators 342 each have a three-dimensional shape obtained by inserting a conical body into a spherical body. The spherical body represents a head of a user (user character), the direction in which the conical body extends represents the line-of-sight direction of the user, and spreading of the conical body represents the visual field of the user.

The space image generation unit 318 arranges the line-of-sight indicators 342 in the three-dimensional virtual space 340 on the basis of the positions and line-of-sight directions of the plurality of users in the three-dimensional content space. When a reproduction button is operated, the space image generation unit 318 moves the positions and directions of the line-of-sight indicators 342 with lapse of time, and thus, directions toward which the users see are expressed by the line-of-sight indicators 342 on the action analysis screen 330. Therefore, the service providing entity can confirm what change is generated in the line-of-sight of each user at a timing of a sound guidance, by watching motions of the line-of-sight indicators 342 arranged in the three-dimensional virtual space 340.

The timeline generation unit 320 generates a timeline image 350 in which information about events generated in the three-dimensional content space is indicated in association with a time axis. The timeline image 350 is displayed so as to indicate a generation time and end time of each of the events on a rectangular time band the left end of which indicates a content start time and the right end of which indicates a content end time. A slider 352 indicates a reproduction position in the three-dimensional virtual space 340. In this example, the line-of-sight indicators 342 of users during an event 1 are displayed in the three-dimensional virtual space 340.

FIG. 10 illustrates another example of the action analysis screen 330. In this example, the timeline generation unit 320 displays, in addition to the timeline image 350, an analysis result of a production (BGM), a user sound, and a production (vibrations). The production data analysis unit 314 analyzes a time change of a volume of BGM from BGM output data, and the timeline generation unit 320 displays the time change as the analysis result of BGM. Further, the production data analysis unit 314 collects sounds of the plurality of users experiencing the same three-dimensional content space, and analyzes the time change of the volume of the sounds, and the timeline generation unit 320 displays the analysis result as the analysis result of user sounds. Further, the production data analysis unit 314 acquires a waveform of drive data for driving a vibrator of the input device 16, and the timeline generation unit 320 displays the waveform as a vibration waveform of the input device 16.

As described above, the timeline generation unit 320 may generate an image in which information about at least one of a generated event, an implemented production, and a sound generated by a user in the three-dimensional content space, is indicated in association with the time axis. The service providing entity can confirm how the users react in the three-dimensional content space or how the production works on the users, by viewing the action analysis screen 330. On the basis of the information, the service providing entity may improve details of the service or add new production to the service.

Moreover, the space image generation unit 318 may infer user emotions from information obtained by detecting the states of the users. For example, when whether a user is excited or calm can be inferred from the user state detection information, the space image generation unit 318 may perform color-coding such that the line-of-sight indicator 342 of a user who is excited is colored red while the line-of-sight indicator 342 of a user who is calm is colored blue. This makes it possible to check that a user got excited as a result of implementation of a production in the three-dimensional content space, for example. That is, the space image generation unit 318 varies display modes of the line-of-sight indicators 342 according to inferred user emotions, so that the service providing entity can check a state where the user actions change according to the emotions.

In the three-dimensional virtual space 340, a sound output position 354 represents a position at which a service sound is outputted. Since the sound output position 354 is indicated in the three-dimensional virtual space 340, the service providing entity can confirm whether the users act to look at the sound output position 354. Note that each of the line-of-sight indicators 342 may be associated with the user profile data. For example, when the service providing entity places a mouse cursor on the line-of-sight indicator 342, the profile data on the corresponding user may be displayed.

Note that, in the user system 3, the imaging device 14 may photograph motion of the user wearing the HMD 100 such that the motion of the user is analyzed. For example, the processing device 11 executes a user attitude estimation process and transmits the estimated attitude data to the management server 5. The management server 5 stores the estimated attitude data in the user behavior DB 8. In the information processing device 300, the behavior history data acquisition unit 304 may acquire the estimated attitude data together with the user behavior history data.

The present invention has been described on the basis of the embodiment. The embodiment is an example, and thus, a person skilled in the art will understand that a combination of the components or processing processes of the embodiment may be variously modified, and such a modification is also within the scope of the present invention.

REFERENCE SIGNS LIST

1 . . . Information processing system, 300 . . . Information processing device, 302 . . . Data acquisition unit, 304 . . . Behavior history data acquisition unit, 306 . . . Event data acquisition unit, 310 . . . Processing unit, 312 . . . Line-of-sight direction acquisition unit, 314 . . . Production data analysis unit, 316 . . . Image generation unit, 318 . . . Space image generation unit, 320 . . . Timeline generation unit, 322 . . . Display processing unit, 330 . . . Action analysis screen, 340 . . . Three-dimensional virtual space, 342 . . . Line-of-sight indicator, 350 . . . Timeline image, 352 . . . Slider, 354 . . . Sound output position

INDUSTRIAL APPLICABILITY

The present invention can be used in the field of processing user behavior history data.

The invention claimed is:

1. An information processing device comprising:
a behavior history data acquisition unit that acquires behavior history data on a plurality of users wearing head mounted displays on heads thereof and experiencing a same three-dimensional content space having a plurality of virtual objects,
wherein the three-dimensional content space is a virtual three-dimensional space;
a line-of-sight direction acquisition unit that acquires line-of-sight directions of the plurality of users in the three-dimensional content space to each of the plurality of virtual objects, from the behavior history data on the plurality of users; and
a screen generation unit that generates, on a basis of the acquired line-of-sight directions of the plurality of users, an image depicting a history of the line of sights of the plurality of users in the virtual three-dimensional space.

2. The information processing device according to claim 1, wherein
the behavior history data acquisition unit acquires, as the behavior history data on the users, operation information for a plurality of user characters in the three-dimensional content space,
wherein operation of each user character of the plurality of user characters is controlled by a user from the plurality of users.

3. The information processing device according to claim 1, wherein
the behavior history data acquisition unit acquires state detection information about each user of the plurality of users experiencing the virtual three-dimensional space.

4. The information processing device according to claim 1, wherein
the behavior history data acquisition unit acquires profile data estimated on a basis of a photographed image obtained by photographing a user before the user wears the head mounted display.

5. The information processing device according to claim 1, wherein
the screen generation unit generates a video depicting line of sight indicators showing the history of the line of sight directions of each of the plurality of user characters in the virtual three-dimensional space.

6. The information processing device according to claim 5, wherein
the video associates a recorded sound of each of the plurality of user characters in association with at least one generated event in the virtual three-dimensional space.

7. An image generation method comprising:
acquiring behavior history data on a plurality of users wearing head mounted displays on heads thereof and experiencing a same virtual three-dimensional space having a plurality of virtual objects;
acquiring line of sight directions of the plurality of users in the three-dimensional content space to each of the plurality of virtual objects, from behavior history data on the plurality of users; and
generating, on a basis of the acquired line of sight directions of the plurality of users, an image depicting a history of the line of sights of the plurality of users in the virtual three-dimensional space.

* * * * *